(12) United States Patent  
Shimizu et al.

(10) Patent No.: US 7,549,353 B2  
(45) Date of Patent: Jun. 23, 2009

(54) VEHICULAR SHIFT LEVER DEVICE

(75) Inventors: Etsuo Shimizu, Toyota (JP); Takayoshi Masuda, Toyota (JP); Yoshiyuki Shindo, Niwa-gun (JP); Yasunori Takeuchi, Chita-gun (JP); Shinichi Uemura, Nagoya (JP)

(73) Assignees: Toyota Jidosha Kabushiki Kaisha, Toyota-shi (JP); Mannoh Kogyo Co., Ltd., Anjo-shi (JP); Kabushiki Kaisha Tokai-Rika-Denki-Seisakusho, Niwa-gun (JP); Tsuda Industries Co., Ltd., Kariya (JP); Kojima Press Industry Co., Ltd., Toyota-shi (JP)

( * ) Notice: Subject to any disclaimer, the term of this patent is extended or adjusted under 35 U.S.C. 154(b) by 353 days.

(21) Appl. No.: 11/445,177

(22) Filed: Jun. 2, 2006

(65) Prior Publication Data

US 2006/0272442 A1    Dec. 7, 2006

(30) Foreign Application Priority Data

Jun. 3, 2005    (JP)    ............................ 2005-164801

(51) Int. Cl.  
    *G05G 5/00*    (2006.01)
(52) U.S. Cl. ............................... 74/471 XY; 74/473.23
(58) Field of Classification Search ................ 74/473.1, 74/473.21–473.23, 473.26, 473.28, 473.33, 74/473.18, 471 XY, 473.27

See application file for complete search history.

(56) References Cited

U.S. PATENT DOCUMENTS 7,104,152 B2 *    9/2006    Levin et al. ............ 74/471 XY

FOREIGN PATENT DOCUMENTS

| JP | 9-86207 | 3/1997 |
| JP | 11-227485 | 8/1999 |
| JP | 2005068684 A * | 3/2005 |

* cited by examiner

*Primary Examiner*—Richard W L Ridley  
*Assistant Examiner*—Terence Boes  
(74) *Attorney, Agent, or Firm*—Oblon, Spivak, McClelland, Maier & Neustadt, P.C.

(57) ABSTRACT

A vehicular shift lever device wherein a path of movement of a shift lever is defined by a guide slot having a corner portion which has an angle of bend of about 90° and which corresponds to an intermediate position of the shift lever that is spaced apart from a parking position in a select direction and from another operating position in a shift direction perpendicular to the select direction, the guide slot having a first guide surface and a second guide surface which define a width in the shift direction of a portion of the guide slot between first and second positions respectively corresponding to the parking and intermediate positions, the first guide surface being more distant in the shift direction than the second guide surface from a third position corresponding to the another operating position, and being inclined with respect to the select direction such that the width of the above-indicated portion of the guide slot decreases from a value at the first position which is larger than a diameter of the shift lever, to a value at the second position, as the portion extends in the select direction from the first position to the second position.

17 Claims, 7 Drawing Sheets

PRIOR ART

FIG.8

PRIOR ART

VEHICULAR SHIFT LEVER DEVICE

BACKGROUND OF THE INVENTION

1. Field of the Invention

The present invention relates in general to a vehicular shift lever device, and more particularly to techniques for improving stability and smoothness of operation of a shift lever from a parking position to other operating positions.

2. Discussion of Related Art

There is known a vehicular shift lever device wherein a path of movement of a shift lever is defined or restricted by a guide slot having a corner portion which has an angle of bend of about 90° and which corresponds to an intermediate position of the shift lever that is spaced apart from a parking position in a select direction and from other operating positions in a shift direction perpendicular to the select direction, so that the guide slot permits the shift lever to be operated from the parking position to one of the other operating positions, when the shift lever is first moved from the parking position to the intermediate position in the select direction and then moved from the intermediate position to the above-indicated one other operating position in the shift direction. JP-11-227485 A discloses an example of such a vehicular shift lever device.

Figure 7:
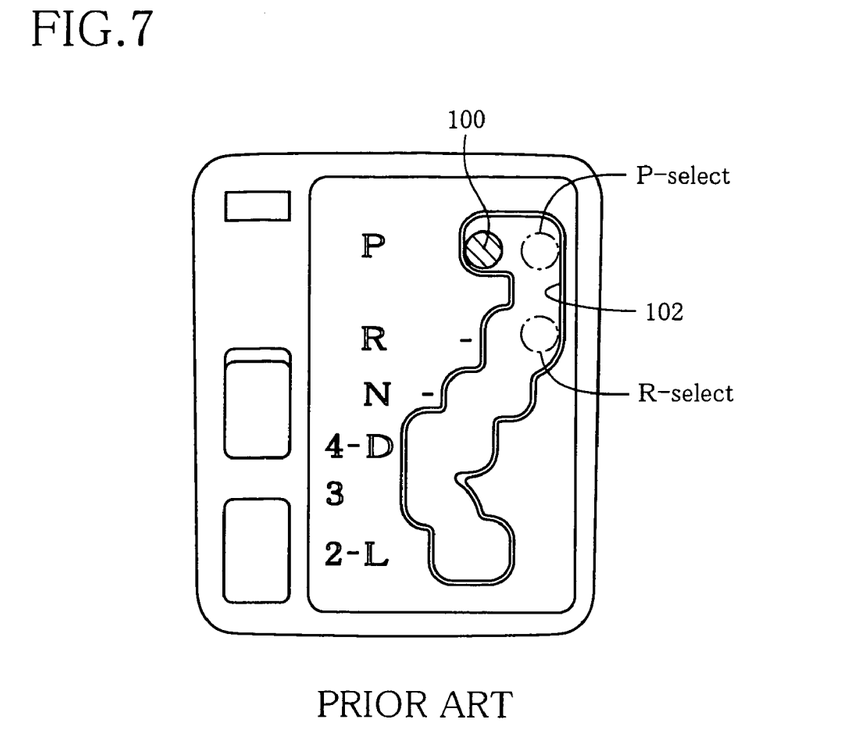
FIG. 7 is a plan view corresponding to that of FIG. 3C, showing a guide slot of a known vehicular shift lever device.

Referring to FIG. 7, there is shown a vehicular shift lever device as disclosed in the above-identified publication, which is disposed at a position of a center console located adjacent to an operator's seat of a vehicle. In this vehicular shift lever device, the path of movement of a shift lever 100 is defined or restricted by a guide slot 102. The shift lever 100 has a plurality of operating positions P, R, N, D, etc. which are spaced apart from each other in the shift direction parallel to the longitudinal direction of the vehicle. The shift lever 100 as shown in FIG. 7 is placed in the parking position P when the vehicle is parked. When the shift lever 100 is operated from the parking position P to the reverse position R for reverse driving of the vehicle, the shift lever 100 is first moved from the parking position P to a parking-select position "P-select" in the select direction parallel to the transverse or width direction of the vehicle, more specifically, in the right direction, and is then moved to a reverse-select position "R-select" in the shift direction parallel to the longitudinal or running direction of the vehicle, more specifically, in the rearward direction of the vehicle. Subsequently, the shift lever 100 is moved from the reverse-select position "R-select" in the left direction to the reverse position R. Thus, the operation of the shift lever 100 from the parking position P to the reverse position R requires a movement of the shift lever 100 along a generally U-shaped path. The parking-select position "P-select" corresponds to the intermediate position described above.

The shift lever is mechanically connected to an automatic transmission via a link or cable, so that a movement of the shift lever in the shift direction actuates a manual valve to switch a hydraulic circuit for permitting a shift-up or shift-down action of the automatic transmission to a newly selected operating position (gear position) or holding the automatic transmission in a presently selected operating position (gear position). For accommodating a specific operating error and an assembling error of the automatic transmission, the shift lever has a suitable amount of play in the shift direction at each of the operating positions P, R, N, D, etc. A rectangular area A indicated by hatching lines in FIG. 8 is an area of play in which the center point of the shift lever 100 (indicated by circles) is movable between the parking position P and the parking-select position "P-select".

Generally, a shift lock member is disposed between the parking position P and the parking-select position "P-select" of the shift lever 100. The shift lock member is arranged to be moved to its retracted or unlocking position for permitting the movement of the shift lever 100 from the parking position P to the parking-select position "P-select", when a predetermined unlocking condition (e.g., an operation of a vehicular braking system) is satisfied. When the predetermined unlocking condition is not satisfied, the shift lock member inhibits the movement of the shift lever 100 from the parking position P to the parking-select position "P-select".

Figure 8:
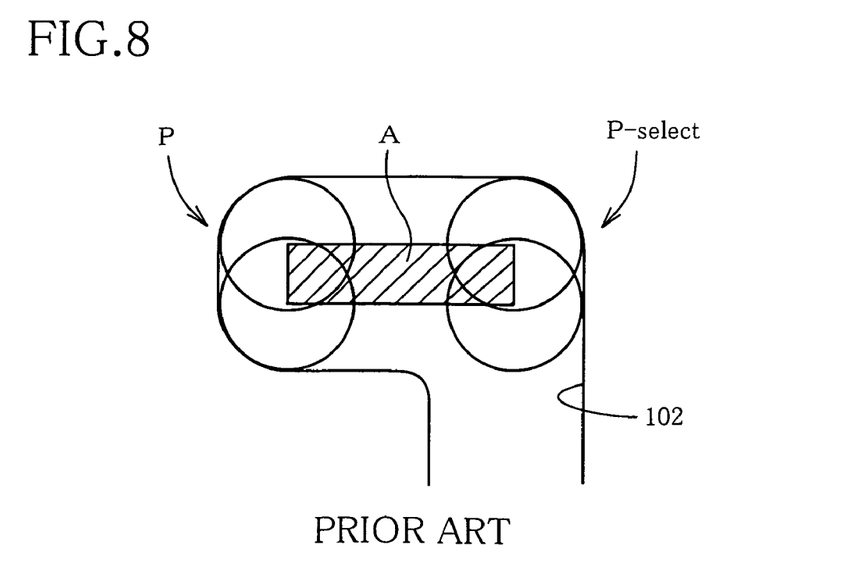
FIG. 8 is an enlarged fragmentary plan view corresponding to that of FIG. 4A, showing a part of the guide slot of FIG. 7.

In the above-described known shift lever device wherein the center point of the shift lever is movable within the area of play A shown in FIG. 8, the shift lever tends to be moved back and forth in the shift direction (longitudinal direction of the vehicle) during the movement from the parking position P to the parking-select position "P-select", or may be moved in the forward direction of the vehicle as the shift lever is moved rightwards toward the parking-select position "P-select". In the latter case, the shift lever must be turned along a bent path of an actuate angle when the shift lever is moved from the parking position toward the reverse-select position "R-select" via the parking-select position "P-select". Thus, the known vehicular shift lever device suffers from a risk of low operating stability and smoothness of the shift lever.

In the known vehicular shift lever device, the shift lock member is required to inhibit the movement of the shift lever from the parking position P to the parking-select position "P-select", irrespective of a path taken by the shift lever within the area of play A shown in FIG. 8. This means that the shift lock member must have a relatively large dimension in the longitudinal direction of the vehicle, resulting in a relatively large space required for allowing the shift lock member to be moved between its locking and unlocking positions, and a consequent problem of increased size and weight of the shift lock member.

SUMMARY OF THE INVENTION

The present invention was made in view of the background art described above. It is therefore an object of this invention to provide a vehicular shift lever device which permits high degrees of operating stability and smoothness of the shift lever upon a movement of the shift lever from its parking position P to any other operating position, and which has reduced size and weight of the shift lock member.

The object indicated above may be achieved according to the principle of the present invention, which provides a vehicular shift lever device wherein a path of movement of a shift lever is defined by a guide slot having a corner portion which has an angle of bend of about 90° and which corresponds to an intermediate position of the shift lever that is spaced apart from a parking position in a select direction and from other operating positions in a shift direction perpendicular to the select direction, so that the guide slot permits the shift lever to be operated from the parking position to one of the other operating positions, when the shift lever is first moved from the parking position to the intermediate position in the select direction and then moved from the intermediate position to said one other operating position in the shift direction, characterized in that the guide slot has a first guide surface and a second guide surface which define a width in the shift direction of a portion of the guide slot between first and second positions respectively corresponding to the parking position and the intermediate position, the first guide surface being more distant in the shift direction than the second guide surface from a third position corresponding to the one other operating position, and being inclined with respect to the select direction, in the shift direction such that the width of the portion of the guide slot decreases from a value at the first position which is larger than a diameter of the shift lever, to a value at the second position, as the above-indicated portion extends in the select direction from the first position to the second position.

The intermediate position is a position from which the shift lever is moved to any other operating position (usually to the parking position) when the shift lever is released by the operator, and is distinguished from operating positions in which the shift lever is held with stability even when the shift lever is released. The shift lever need not have a play at this intermediate position, to accommodate a specific operating error and an assembling error of an automatic transmission.

In the shift lever device constructed according to the present invention, the first guide surface of the guide slot is inclined with respect to the select direction such that the width of the portion of the guide slot 72 between the first and second positions decreases as the above-indicated portion extends in the select direction from the first position corresponding to the parking position to the second position corresponding to the intermediate position. This inclination of the first guide surface prevents back and forth movements or rattling movements of the shift lever in the shift direction during the movement of the shift lever 12 from the parking position to the intermediate position. Further, the inclined first guide surface permits the shift lever to be turned by about 90° or an obtuse angle at the intermediate position, so that the shift lever can be smoothly moved from the intermediate position in the shift direction toward the above-indicated one other operating position. Thus, the guide slot having the inclined first guide surface assures improved degrees of stability and smoothness of operation of the shift lever when the shift lever is operated from the parking position to the other operating position via the intermediate position. It is noted in particular that the shift lever is likely to be moved from the parking position to the intermediate position, in sliding contact with the inclined first guide surface of the guide slot. In this case, the sliding contact of the shift lever with the first guide surface causes the shift lever to receive a reaction force in a direction normal to the inclined first guide surface, when the shift lever is operated by an operating force which cooperates with the reaction force to produce a resultant force acting on the shift lever. The resultant force received by the shift lever has a component acting in the shift direction in which the shift lever is moved from the intermediate position to the other operating position, so that the operating force required to move the shift lever in the shift direction toward the other operating position is accordingly reduced, making it possible to further reduce the smoothness of operation of the shift lever from the parking position to the other operating position via the intermediate position.

It is also noted that the amount of play of the shift lever in the shift direction at a position near the intermediate position can be made very small or almost zero, so that the required width dimension of a shift lock lever member as measured in the shift direction can be reduced, with a result of a decrease of the required space for pivoting the shift lock member to its unlocking position, whereby the required size and weight of the shift lock member can be reduced. The shift lock member is provided for inhibiting a movement of the shift lever from the parking position to the intermediate position. As indicated above, the sliding contact of the shift lever with the inclined first guide surface of the guide slot which is likely to take place during the movement of the shift lever from the parking position to the intermediate position causes the shift lever to receive the reaction force, so that the load acting on the shift lever in the select direction is reduced, whereby the strength of the shift lock member required to withstand the load acting on the shift lever in the select direction is accordingly reduced, making it possible to further reduce the required size and weight of the shift lock member.

The vehicular shift lever device of the present invention is disposed at a position of a center console located adjacent to an operator's seat of the vehicle, for example. However, the vehicular shift lever device may be disposed in an instrumental panel or steering column of the vehicle.

For example, the shift lever is supported by a shift shaft extending in the transverse or width direction of the vehicle such that the shift lever is pivotable about the shift shaft in the longitudinal or running direction of the vehicle, or in the vertical direction. In this case, the shift lever is further supported by a select shaft extending perpendicularly to the shift shaft such that the shift lever is pivotable about the select shaft in the transverse direction of the vehicle. However, the shift lever may be supported by a ball joint or any other device which permits movements of the shift lever to a plurality of operating positions.

The operating positions of the shift lever may include, other than the parking position, a neutral position in which power is not transmitted through a transmission operatively connected to the shift lever device, a reverse-drive position for reverse driving of the vehicle, and a forward-drive position for forward driving of the vehicle. When the shift lever is placed in the parking position, the output shaft of automatic transmission is locked by a parking lock mechanism, for instance.

The shift lever device may include a shift lock member disposed between the parking position and the intermediate position (e.g., parking-select position described above in the BACKGROUND OF THE INVENTION). The shift lock member, when placed in its locking position, prevents a movement of the shift lever from the parking position to the intermediate position in the select direction. When a predetermined unlocking condition is satisfied, the shift lock member is electrically or mechanically brought into its unlocking position to permit the movement of the shift lever from the parking position to the intermediate position. The predetermined unlocking condition is suitably determined, for example, a condition that a braking system of the vehicle has been operated, or a key provided on the vehicle is placed in a predetermined position.

The shift lock member may be arranged to be movable in a direction almost perpendicular to the path of movement of the shift lever between the parking position and the intermediate position. For instance, the shift lock member is supported by a support shaft parallel to the shift shaft, pivotably between the locking and unlocking positions. However, the shift lock member may be linearly movable between the locking and unlocking positions.

As described above, the width of the guide slot at the first position corresponding to the parking position is larger than the diameter of the shift lever. An amount of play of the shift lever at the parking position corresponds to a difference between the width of the guide slot and the diameter of the shift lever. This amount of play is suitably determined depending upon the specific operating error and assembling error of the automatic transmission operatively connected to the shift lever. For instance, the shift lever is mechanically connected to the automatic transmission through a link or cable, so that a movement of the shift lever in the shift direction actuates a manual valve to switch a hydraulic circuit for permitting a shift-up or shift-down action of the automatic transmission to a newly selected operating position (gear position) or holding the automatic transmission in a presently selected operating position (gear position). For accommodating the specific operating error and an assembling error of the automatic transmission, the shift lever is required to have a suitable amount of play in the shift direction at some of its operating positions such as the parking position. However, the shift lever need not have a play in the shift direction at the intermediate position through which the shift lever is merely moved between the operating positions. Namely, the amount of play at the intermediate position of the shift lever may be zero, or smaller than that at the parking position.

As described above, the first guide surface partially defining the portion of the guide slot between the first and second positions respectively corresponding to the parking and intermediate positions is inclined with respect to the select direction, in the shift direction in which the shift lever is moved from the intermediate position to the other operating position, as the above-indicated portion extends in the select direction from the first position to the second position. On the other hand, the second guide surface may be substantially parallel to the select direction (perpendicular to the shift direction), or inclined in the shift direction toward the third position corresponding to the other operating position, like the first guide surface, provided the angle of inclination of the second guide surface is determined such that the width of the portion of the guide slot between the first and second positions decreases as this portion extends in the select direction from the first position to the second position.

For instance, the first guide surface is a straight guide surface inclined by a predetermined angle with respect to the select direction. Alternatively, the first guide surface may be a curved guide surface the curvature of which increases as it approaches the second position corresponding to the intermediate position, so that the width defined by the curved first guide surface and the second guide surface decreases as the above-indicated portion of the guide slot extends from the first position corresponding to the parking position to the second position.

BRIEF DESCRIPTION OF THE DRAWING

The foregoing and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENT

Figure 1:
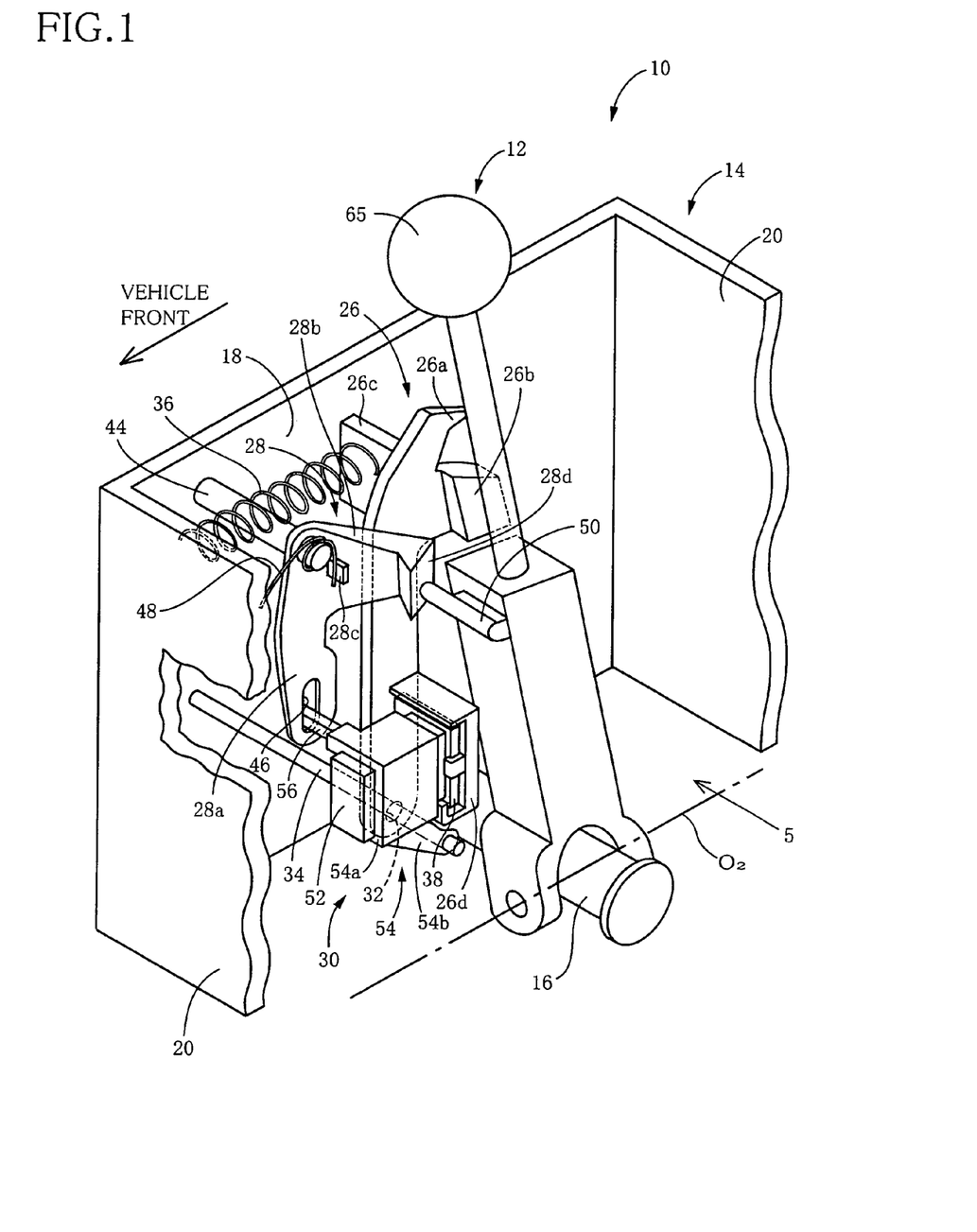
FIG. 1 is a perspective view schematically showing an arrangement of a vehicular shift lever device constructed according to one preferred embodiment of this invention.
Figure 2:
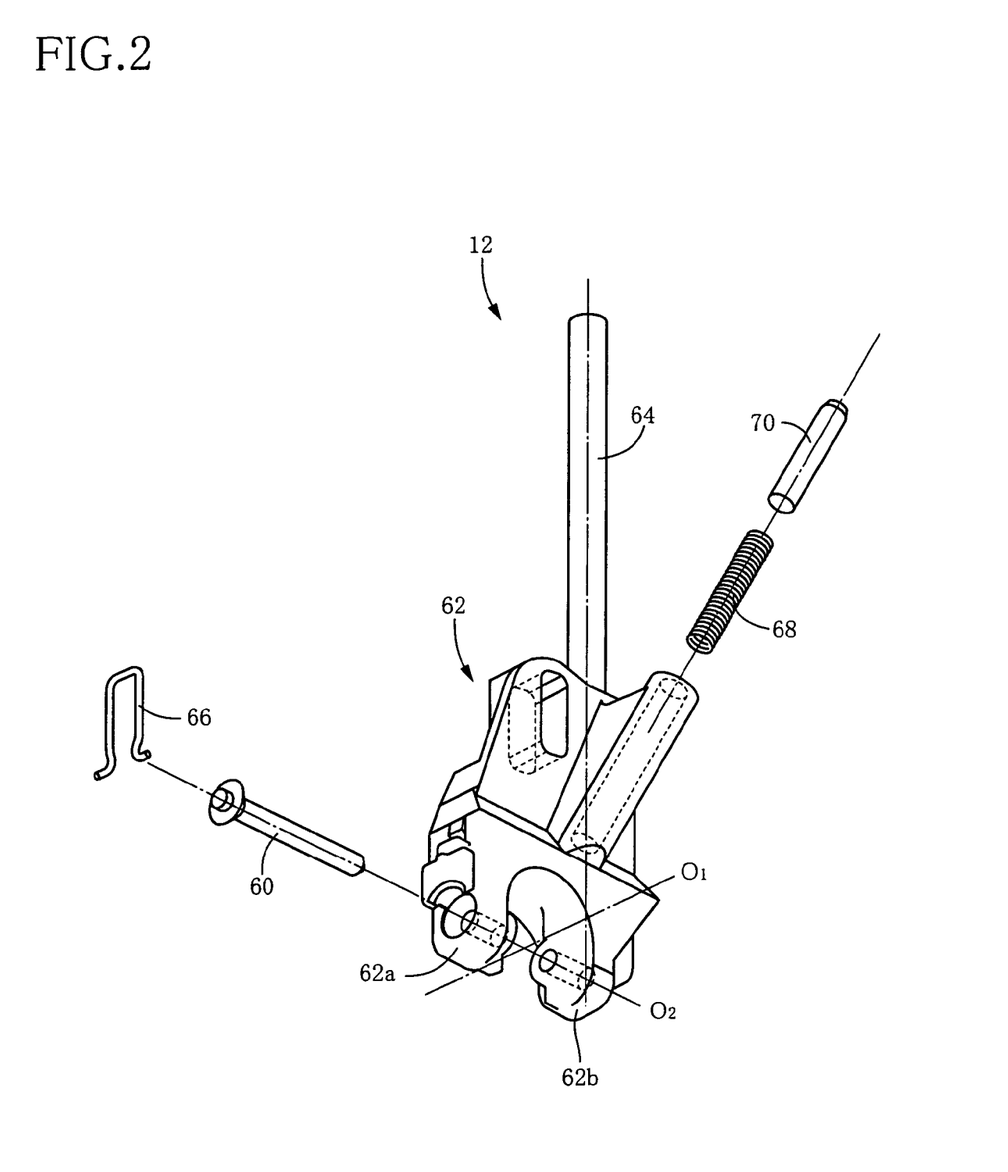
FIG. 2 is an exploded fragmentary perspective view of a shift lever of the vehicular shift lever device of FIG. 1.

Referring first to the perspective view of FIG. 1, there is schematically shown the arrangement of a vehicular shift lever device 10 constructed according to one preferred embodiment of this invention. The vehicular shift lever device 10 includes a shift lever 12 a part of which is shown in the exploded fragmentary perspective view of FIG. 2, and is disposed at a position of a center console located adjacent to an operator's seat of a vehicle. The vehicular shift lever device 10 is supported by a base member 14 fixed to a floor of the vehicle, for example, and includes a shift shaft 16 supported by the base member 14 such that the shift shaft 16 is rotatable about a first axis $O_1$ (indicated in FIG. 2) which extends in a horizontal direction parallel to the transverse or width direction of the vehicle. The vehicular shift lever device 10 further includes a select shaft 60 which extends through the shift shaft 16 and a lower portion of the shift lever 12 and which has a second axis $O_2$ extending in a horizontal direction perpendicular to the first axis $O_1$ and parallel to the longitudinal or running direction of the vehicle, as shown in FIG. 2. The shift lever 12 is supported by the shift shaft 16 and the select shaft 60 such that the shift lever 12 is pivotable about the first axis $O_1$ and accordingly movable in the longitudinal direction of the vehicle, and is also pivotable about the second axis $O_2$ and accordingly movable in the transverse direction of the vehicle. The base member 14 has a rectangular box-like structure including a pair of longitudinal walls 18 (only one of them being shown in FIG. 1) parallel to the longitudinal direction of the vehicle, and a pair of transverse walls 20 parallel to the transverse direction of the vehicle. The shift shaft 16 is supported by the pair of longitudinal walls 18, so as to be rotatable about the first axis $O_1$.

Referring to FIG. 2, the shift lever 12 includes a lever-mounting member 62 through which the select shaft 60 extends, and a rod 64 which is fixed to the lever-mounting member 62 and which is formed of a ferrous material. The lever-mounting member 62 includes a bifurcated part having a pair of leg portions 62a, 62b located on the diametrically opposite sides of the shift shaft 16. The select shaft 60 extends through the pair of leg portions 62a, 62b and the shift shaft 16 such that the second axis $O_2$ of the select shaft 60 is perpendicular to the first axis $O_2$ of the shift shaft 16. Thus, the shift lever 12 is supported by the shift shaft 16 via the select shaft 60. The select shaft 60 is retained in place relative to the lever-mounting portion 62, by a retainer 66 in the form of a clip which is fixed to the leg portion 62a and held in engagement with the head portion of the select shaft 60, so that the removal of the select shaft 60 from the lever-mounting portion 62 and the shift shaft 16 is prevented. As shown in FIG.

1, the rod 64 has a knob 65 screwed or otherwise fastened to its upper end portion. The shift lever 12 is operated at its knob 65 by the vehicle operator.

Figure 3A:
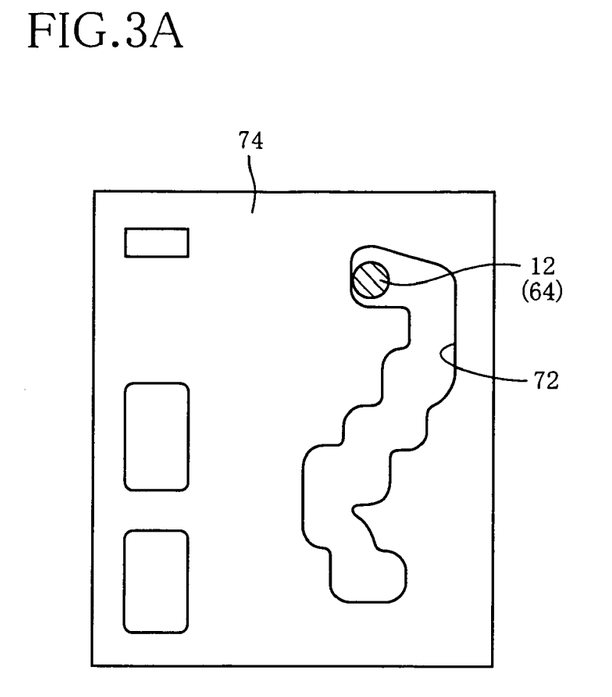
FIG. 3A is a plan view of a guide plate for guiding the shift lever of FIG. 2, showing.
Figure 3B:
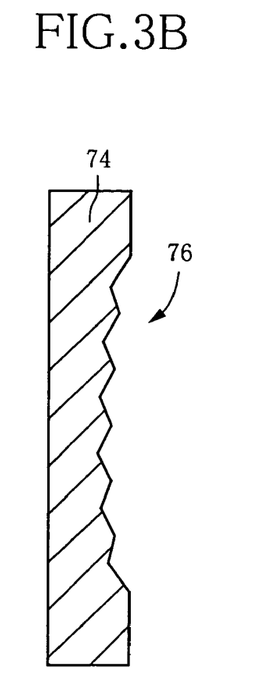
FIG. 3B is a vertical cross sectional view of the guide plate.
Figure 3C:
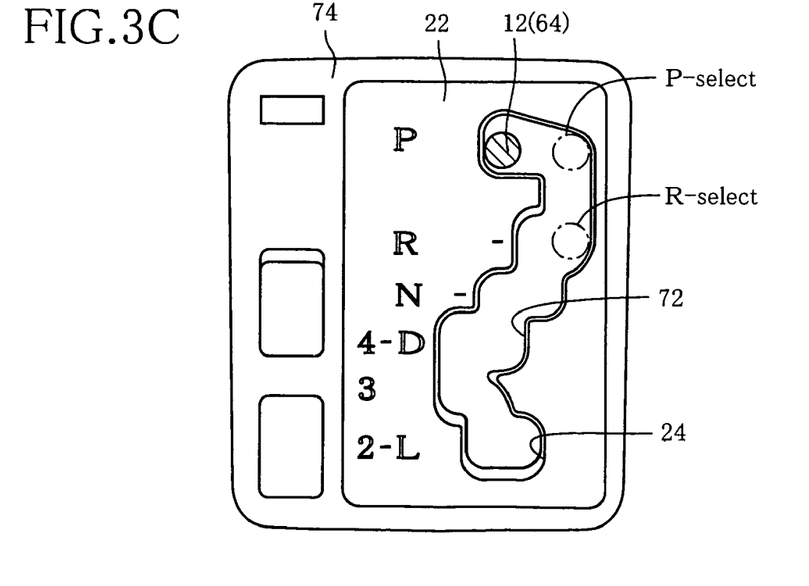
FIG. 3C is a plan view showing an indicia plate attached to the guide plate.

The box-like structure of the base member 14 is provided at its upper end with a guide plate 74 having a guide slot 72 which defines a path of pivotal movement of the shift lever 12, as shown in FIG. 3A. The shift lever 12 is guided at its rod 64 by the guide slot 72 formed through the guide plate 74. On the upper surface of the guide plate 74, there is fixed an indicia plate 22 having indicia indicative of operating positions: PARKING position P; REVERSE position R; NEUTRAL position N; DRIVE position D, etc., as shown in FIG. 3C. The indicia plate 22 has a cutout 24 substantially identical in shape with the guide slot 72, and the rod 64 extends through the cutout 24 as well as the guide slot 72, so that shift lever 12 is operable to a selected one of the operating positions P, R, N, D, etc. The shift lever 12 is pivotally moved to the selected operating position along the guide slot 62, by movements of the shift lever 12 in the select direction parallel to the transverse direction of the vehicle, and movements of the shift lever 12 in the shift direction parallel to the longitudinal direction of the vehicle. A movement of the shift lever 12 in the shift direction causes a movement of a spool of a manual valve of an automatic transmission of the vehicle mechanically connected to the shift lever 12 through a cable or link, so that a hydraulic circuit is switched to place the automatic transmission in a selected one of its operating states: a parking state in which an output shaft of the automatic transmission is locked to inhibit its rotary motion; a reverse-drive state for reverse running of the vehicle; a neutral state in which power is not transmitted through the automatic transmission; a forward-drive state in which the automatic transmission is placed in a selected one of a plurality of forward-drive gear positions.

As described above, the shift lever 12 is mechanically connected to the automatic transmission, and is operable to the selected one of the operating positions P, R, N, D, etc., to place the automatic transmission in the corresponding operating state. To accommodate or absorb a specific operation error and an assembling error of the automatic transmission, the shift lever 12 has a suitable amount of play in the shift direction at each of the operating positions P, R, N, D, etc. As shown in FIG. 2, the lever-mounting portion 62 of the shift lever 12 is provided with a detent pin 70 biased by a detent spring 68 in the form of a compression coil spring in a direction away from the lever-mounting portion. On the other hand, the guide plate 74 has a serrated inner surface 76 having a plurality of teeth defining a plurality of recessed portions corresponding to the respective operating positions P, R, N, D, etc. of the shift lever 12, as shown in FIG. 3B. The recessed portions are spaced apart from each other in the shift direction. The detent pin 70 is brought into pressing engagement with one of the recessed portions of the serrated inner surface 76, so that the shift lever 12 is held in the selected operating position within the above-indicated amount of play in the shift direction. It is noted that the guide plate 74 functions as a guide member, and that FIG. 3A is a plan view of the guide plate 74 while FIG. 3B is a vertical cross sectional view of the guide plate 74.

The shift lever 12 guided by the guide slot 72 is of a gate type arranged to prevent an erroneous operation owing to a path of movement defined by the shape of the guide slot 72. When the shift lever 12 is moved from the PARKING position P to any other operating position, the shift lever 12 is first pivoted rightwards toward the right longitudinal wall 18 (shown in FIG. 1), about the second axis $O_2$. To permit and inhibit this rightward pivotal movement of the shift lever 12 from the PARKING position P, the shift lever device 10 is provided with a shift lock member in the form of a lock lever 26, a cam link 28, and a solenoid link 30.

Figure 5A:
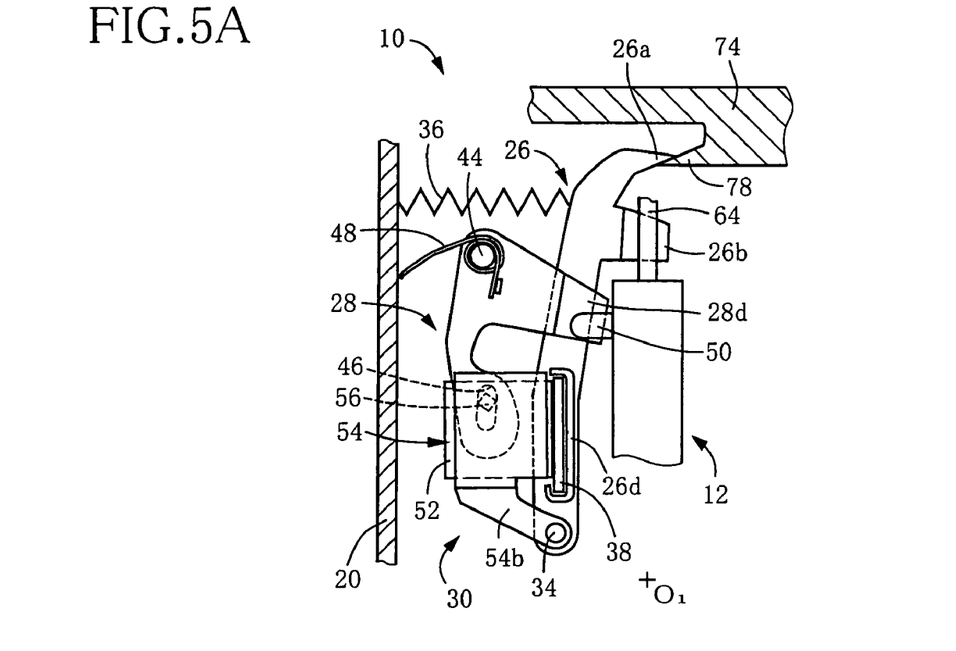
FIG. 5A is an elevational view partly in cross section taken in a direction of arrow 5 indicated in FIG. 1.

The lock lever 26 is a generally elongate planar member supported by a first support shaft 34 extending through a through-hole 32 formed in a lower portion thereof, such that the lock lever 26 is rotatable or pivotable about the axis of the first support shaft 34. The first support shaft 34 is supported by the pair of longitudinal walls 18 such that the first support shaft 34 extends in parallel with the shift shaft 16 and is located in front of the shift shaft 16 as seen in the longitudinal direction of the vehicle. The lock lever 26 is pivotable about the first support shaft 34, such that an upper end portion of the lock lever 26 is movable in the longitudinal direction of the vehicle. The lock lever 26 includes an engaging jaw 26a integrally formed at its upper end so as to project in the rearward direction of the vehicle. The lock lever 26 is held in its locking position (which will be described), with its engaging jaw 26a held in abutting contact with an engaging portion 78 formed on the underside of the guide plate 74, as shown in FIG. 5A. In other words, the locking position of the lock lever 26 is defined by the engaging portion 78 of a guide member in the form of the guide plate 74, more precisely, by the engagement of the engaging jaw 26a with the engaging portion 78 of the guide member 74. The lock lever 26 further includes an abutting portion 26b having a larger thickness that the other portion. The abutting portion 26b is formed slightly below the engaging jaw 26a, so as to extend in the rearward direction of the vehicle, like the engaging jaw 26a. When the lock lever 26 is placed in the locking position, the abutting portion 26b is located on the left side of and adjacent to the rod 64 of the shift lever 12 placed in the PARKING position P, so that the rod 64 is brought into abutting contact with the abutting portion 26b during an initial rightward movement of the rod 64 when the shift lever 12 is moved rightwards from the PARKING position P, whereby the operation of the shift lever 12 from the PARKING position P to a parking-select position "P-select" (indicated in FIG. 3C) is inhibited by the abutting portion 26b. In the present embodiment, the pivotal movement of the lock lever 26 causes a movement of the abutting portion 26b in the longitudinal direction of the vehicle (shift direction) perpendicular to the transverse direction of the vehicle (select direction) in which the shift lever 12 is moved from the PARKING position P to the parking-select position "P-select".

Figure 5B:
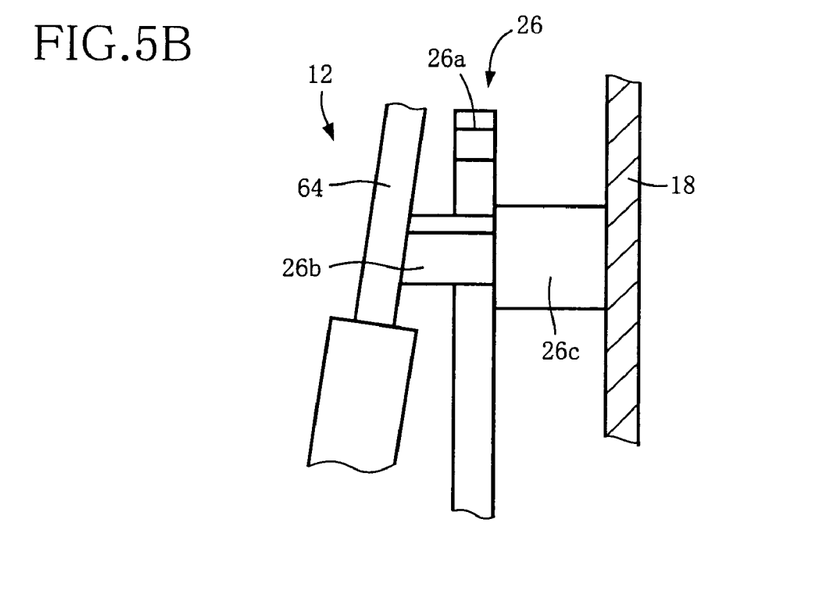
FIG. 5B is an elevational view partly in cross section taken from the right side of FIG. 5A when the shift lever is placed in its locking position.

Reference is then made to FIG. 5A which is an elevational view partly in cross section taken in a direction of arrow 5 indicated in FIG. 1, and FIG. 5B which is an elevational view partly in cross section taken from the right side of FIG. 5A, namely, in the forward direction of the vehicle, when the shift lever is placed in its locking position. As shown in FIG. 1 and FIG. 5B, the lock lever 26 further includes a support plate portion 26c formed integrally so as to extend rightwards toward the right longitudinal wall 18, away from the shift lever 12, so that the support plate portion 26c is in sliding contact with the inner surface of the right longitudinal wall 18, whereby a substantive portion of a force exerted from the shift lever 12 onto the lock lever 26 is received by the right longitudinal wall 18 via the support plate portion 26c, when the shift lever 12 is brought into abutting contact with the abutting portion 26b of the lock lever 26 placed in its locking position. When the shift lever 12 is in abutting contact with the abutting surface of the abutting portion 26b, the rod 64 is inclined rightwards from the vertical plane. In view of this fact, the abutting surface of the abutting portion 26b is inclined from the vertical plane, by an angle substantially equal to the angle of rightward inclination of the rod 64 upon abutting contact with the abutting portion 26b.

Referring back to FIG. 1, the shift lever device 10 includes a return spring 36 in the form of a compression coil spring one end of which is fixed to the support plate portion 26c and the other end of which is fixed to the front transverse wall 20. Normally, the lock lever 26 is held in its locking position under a biasing action of the return spring 36 biasing the upper end portion of the lock lever 26 in the rearward direction of the vehicle. The lock lever 26 further includes a bracket portion 26d fixed to the lower end portion such that the bracket portion 26d extends substantially in parallel with the longitudinal direction of the lock lever 26. The bracket portion 26d holds a yoke 38 formed of a ferrous material.

The cam link 28 includes a vertical portion 28a extending in the vertical direction, and a horizontal portion 28b which extends from an upper end part of the vertical portion 28a in the horizontal direction toward the rear transverse wall 20. The horizontal portion 28b has a thickness that increases as it extends toward the rear transversal wall 20. A second support shaft 44 supported by the right longitudinal wall 18 extends through the upper end part of the vertical portion 28a in the transverse direction of the vehicle. The cam link 28 is pivotable about the second support shaft 44. The vertical portion 28a has an elongate hole 46 formed therethrough so as to extend in the vertical direction. The solenoid link 30 carries a pin 56 extending through the elongate hole 46. The vertical portion 28a further has a protruding portion 28c formed at its upper end part. A torsion coil spring 48 is wound on the second support shaft 44 at a position near the cam link 28. The torsion coil spring 48 is held at one of its opposite ends in engagement with the protruding portion 28c and at the other end with the inner surface of the front transversal wall 20. The cam link 28 is biased by the torsion coil spring 48 in a counterclockwise direction as seen in FIG. 1, and is normally held in its original position of FIG. 1 under a biasing action of the torsion coil spring 48. In this original position, the lower end of the vertical portion 28a is located at its rearmost position.

The horizontal portion 28b has a cam surface 28d formed on its distal end remote from the vertical portion 28a. The cam surface 28d is inclined such that a distance between the cam surface 28d and the shift lever 12 in the transversal direction of the vehicle increases as the cam surface 28d extends toward the rear transversal wall 20 in the longitudinal direction of the vehicle, that is, such that the distance between the cam surface 28d and the right longitudinal wall 18 decreases as the cam surface 28d extends toward the front transversal wall 20. The shift lever 12 is provided with a pusher pin 50 which comes into abutting contact with the inclined cam surface 28d when the shift lever 12 is pivoted about the second axis $O_2$ from its PARKING position P toward the parking-select position "P-select", namely, toward the lock lever 26 and cam link 28. The pusher pin 50 is positioned relative to the cam link 28 placed in the original position of FIG. 1 such that the pusher pin 50 initially contacts an area of the cam surface 28d which is lower than the axis of the second support shaft 44. When the pusher pin 50 is brought into abutting contact with the cam surface 28d during the pivotal movement of the shift lever 12 toward the right longitudinal wall 18, the cam link 28 is pivoted about the second support shaft 44 in a clockwise direction from the original position of FIG. 1 to an operated position against the biasing force of the torsion coil spring 48, as described below in detail by reference to FIG. 3B. The clockwise pivotal movement of the cam link 28 causes the lower end of the vertical portion 28a to move toward the front transversal wall 20 to which the torsion coil spring 48 is fixed at its one end.

The solenoid link 30 described above includes a solenoid 52 and a holder casing 54 holding the solenoid 52. The holder casing 54 includes a holder portion 54a of box construction, and a leg portion 54b extending from the lower wall of the holder portion 54a. The first support shaft 34 described above extends through the leg portion 54b, such that the solenoid link 30 as well as the lock lever 26 is pivotable about the first support shaft 34. The pin 56 described above extends from the holder portion 54a of the solenoid link 30, and is held in engagement with the elongate hole 46 formed in the cam link 28. In this arrangement, the solenoid link 30 is pivotable in the counterclockwise direction about the first support shaft 34 to its operated position when the cam link 28 is pivoted in the clockwise direction about the first support shaft 34 its operated position. The holder casing 54 holds the solenoid 52 such that an end portion of the solenoid 52 on the side of the yoke 38 extends from the holder portion 54a toward the yoke 38. When the solenoid 52 is energized, the yoke 38 is attracted to the solenoid 52, whereby the lock lever 26 having the yoke 38 is pivotable about the first support shaft 34 together with the solenoid link 30.

Referring to the elevational views of FIGS. 5A and 5B, there will be described an operation of the shift lever device 10. FIG. 5B shows an initial state of the shift lever device 10 when the shift lever 12 is placed in the PARKING position P with its pusher pin 50 spaced apart from the cam surface 28d, while the lock lever 26 is held in the locking position under the biasing action of the return spring 36, with its engaging jaw 26a held in engagement with the engaging portion 78. In this initial state, the solenoid link 30 and the cam link 28 operatively connected to the solenoid link 30 are held in their original position under the biasing action of the torsion coil spring 48, with the solenoid 52 held in contact with the yoke 38.

Figure 6A:
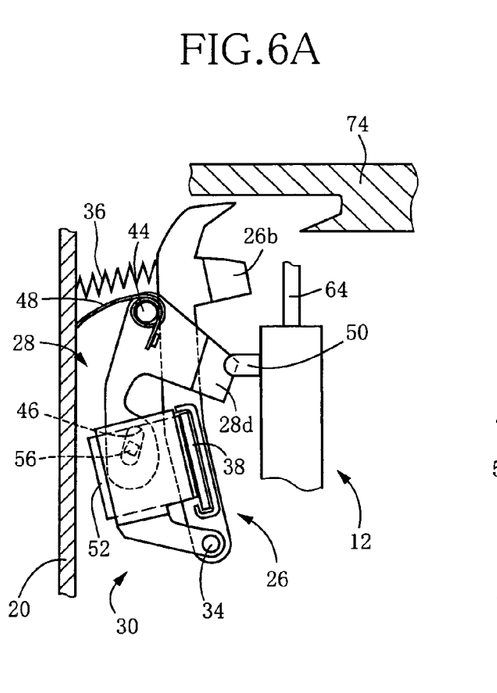
FIG. 6A is an elevational view partly in cross section for explaining an operation of the vehicular shift lever device when the shift lever is placed in its unlocked state.
Figure 6B:
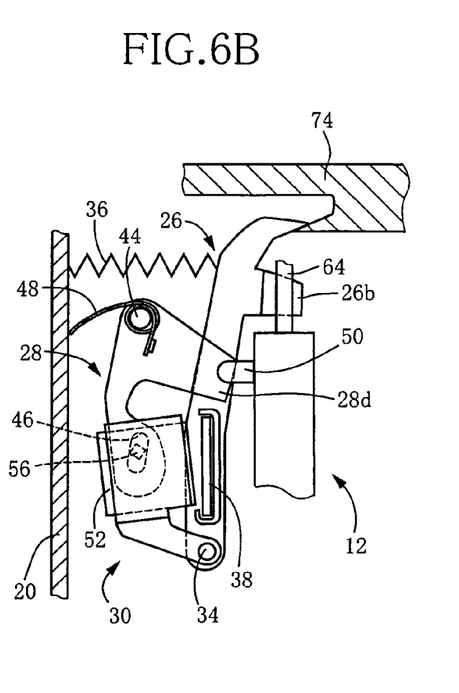
FIG. 6B is an elevational view partly in cross section for explaining an operation of the vehicular shift lever device when the shift lever is placed in its locked state.

When the shift lever 12 is pivoted about the second axis $O_2$ in the select direction toward the right longitudinal wall 20 while the shift lever device 10 is placed in its initial state described above, the pusher pin 50 comes into abutting contact with the cam surface 28d of the cam link 28, so that the cam link 28 is pivoted clockwise about the second support shaft 44, from the original position of FIG. 6B to its operated position of FIG. 6A. Since the cam link 28 and the solenoid link 30 are operatively connected to each other through the engagement of the pin 56 with the elongate hole 46, the counterclockwise pivotal movement of the cam link 28 causes a counterclockwise movement of the solenoid link 30 about the first support shaft 34.

If the solenoid 52 is in the energized state when the solenoid link 30 is pivoted counterclockwise, the yoke 38 is attracted to the solenoid 52, so that the lock lever 26 is pivoted counterclockwise about the first support shaft 34 against the biasing force of the return spring 36, during the counterclockwise pivotal movement of the solenoid link 30, as shown in FIG. 6A. Thus, the lock lever 26 is pivoted from its locking position to its unlocking position as the shift lever 12 is pivoted from the PARKING position P in the select direction while the solenoid 52 is placed in the energized state. In the unlocking position of the lock lever 26 established by the pivotal movement of the shift lever 12 in the select direction, the abutting portion 26b of the lock lever 26 does not interfere with the path of movement of the shift lever 12 (rod 64) from the PARKING position P to the parking-select position "P-select", and permits the movement of the shift lever 12 to the parking-select position "P-select". A magnetic force which is generated by the solenoid 52 and by which the yoke 38 is attracted to the solenoid 52 is determined based on the biasing force of the return spring 36, so as to be larger enough to prevent removal of the yoke 38 from the solenoid 52 due to the biasing force of the return spring 36.

If the solenoid 52 is in the de-energized state when the solenoid link 30 is pivoted counterclockwise with the clockwise pivotal movement of the cam link 28, the lock lever 26 remains in its locking position (initial state of FIG. 5A and FIG. 6B), so that the shift lever 12 comes into abutting contact with the abutting portion 26b of the lock lever 26 during the pivotal movement of the shift lever 12 toward the parking-select position "P-select", whereby the shift lever 12 is prevented from being further pivoted to the parking-select position "P-select".

Figure 4A:
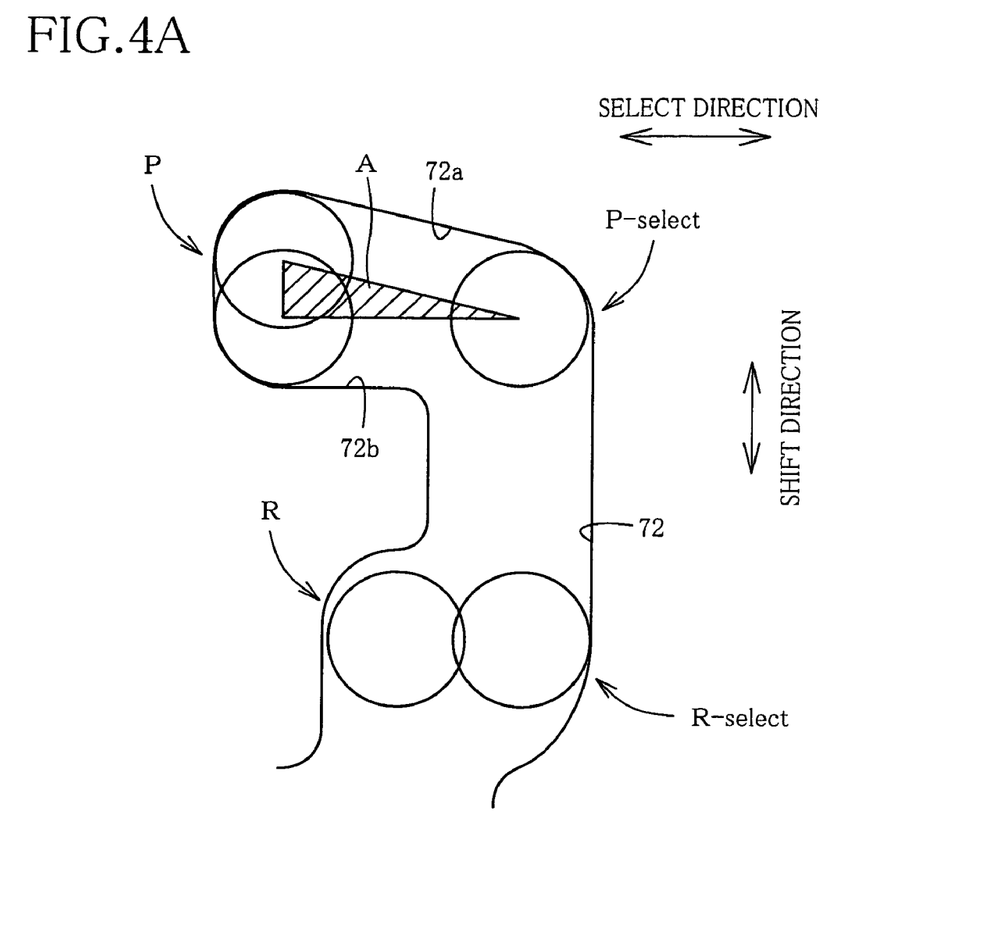
FIG. 4A is an enlarged fragmentary plan view showing a part of a guide slot formed through the guide plate of FIGS. 3A-3C, showing a path of movement of the shift lever from a PARKING position to a REVERSE position.

The shift lever 12 permitted to be moved rightwards from the PARKING position P to the parking-select position "P-select" is then turned at this parking-select position "P-select" along a corner portion of the guide slot 72 having an angle of bend of about 90°, to be moved in the shift direction parallel to the longitudinal direction of the vehicle, to a reverse-select position "R-select", as indicated in FIG. 4A. From the reverse-select position "R-select", the shift lever 12 is moved leftwards to the REVERSE position R. Thus, the shift lever 12 is required to be moved along a generally U-shaped path, from the PARKING position P to the REVERSE position R. As described above, the shift lever 12 has a suitable amount of play at the PARKING position P in the shift direction, as indicated in FIG. 4A. Namely, a width of the guide slot 72 at the PARKING position P as measured in the shift direction is larger than the diameter of the rod 64 of the shift lever 12. However, the amount of play at the parking-select position "P-select" is almost zero. Described in detail, the guide slot 72 has a first guide surface in the form of a front straight guide surface 72a which partially defines a portion of the guide slot 72 between a first position corresponding to the PARKING position P and a second position corresponding to the parking-select position "P-select", and a second guide surface in the form of a rear straight guide surface 72b which partially defines a part of the above-described portion and which is opposed to the front guide surface 72a in the shift direction. The front guide surface 72a is located on the front side of the vehicle, and is more distant than the rear guide surface 72b from a third position corresponding to the reverse-select position "R-select" in the shift direction, while the rear guide surface 72b is spaced from the front guide surface 72a in the rearward direction of the vehicle in which the shift lever 12 is moved from the parking-select position "P-select" toward the reverse-select position "R-select". These front and rear guide surfaces 72a, 72b define the width of the above-indicated portion of the guide slot 72 between the first and second positions respectively corresponding to the PARKING position P and the parking-select position "P-select". As indicated in FIG. 4A, the front guide surface 72a is inclined with respect to the select direction, in the rearward direction as it extends in the rightward direction toward the second position, while the rear guide surface 72b is parallel to the shift direction (transverse direction of the vehicle), so that the width of the above-indicated portion of the guide slot 72 decreases linearly as the above-indicated portion extends from the first position to the second position". A triangular area A indicated by hatching lines in FIG. 4A is an area of play in which the center point of the rod 64 of the shift lever 12 (indicated by circles) is movable between the PARKING position P and the parking-select position "P-select". The parking-select position "P-select" is an intermediate position through which the shift lever 12 is moved from the PARKING position P to the reverse-select position "R-select" (REVERSE position R).

In the shift lever device 10 constructed according to the present preferred embodiment of this invention, the front guide surface 72a of the guide slot 72 is inclined with respect to the select direction, in the rearward direction of the vehicle to linearly reduce the width of the portion of the guide slot 72 between the first and second positions, as the front guide surface 72a extends in the rightward direction from the first position corresponding the PARKING position P to the second position corresponding to the parking-select position "P-select". This inclination of the front guide surface 72a prevents back and forth movements or rattling movements of the shift lever 12 in the shift direction (longitudinal direction of the vehicle) during the movement of the shift lever 12 from the PARKING position P to the parking-select position "P-select". Further, the inclined front guide surface 72a permits the shift lever 12 to be turned by about 90° or an obtuse angle at the parking-select position "P-select", so that the shift lever 12 can be smoothly moved from the parking-select position "P-select" in the shift direction, more precisely, in the rearward direction, toward the reverse-select position "R-select". Thus, the guide slot 72 having the inclined front guide surface 72 assures improved degrees of stability and smoothness of operation of the shift lever 12 when the shift lever 12 is operated from the PARKING position P to the REVERSE position R (reverse-select position "R-select") via the intermediate position in the form of the parking-select position "P-select".

Figure 4B:
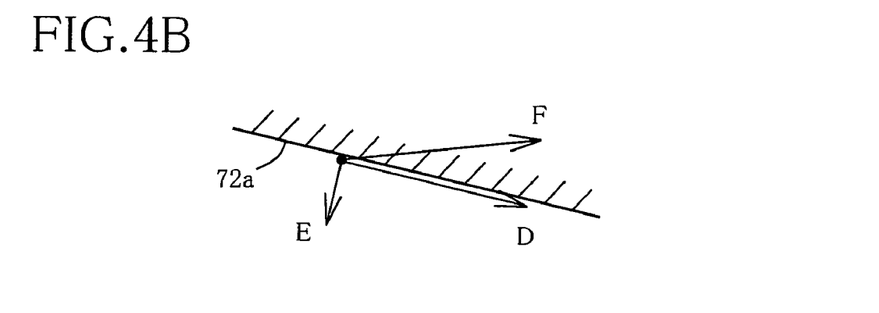
FIG. 4B is a view for explaining a function of an inclined front guide surface of the guide slot of FIG. 4A.

It is noted in particular that the shift lever 12 is likely to be moved from the PARKING position P to the parking-select position "P-select", with the rod 64 held in sliding contact with the front guide surface 72a of the guide slot 72. In this case, the sliding contact of the rod 64 with the front guide surface 72a causes the shift lever 12 to receive a reaction force E in a direction normal to the inclined front guide surface 72a, as indicated in FIG. 4B, when the shift lever 12 is operated by an operating force F. The operating force F and the reaction force E cooperate to produce a resultant force D acting on the shift lever 12. In other words, the resultant force D received by the shift lever 12 has a component acting in the rearward direction in which the shift lever 12 is moved from the parking-select position "P-select" to the reverse-select position "R-select", so that the operating force required to move the shift lever 12 in the rearward direction toward the reverse-select position "R-select" is accordingly reduced, making it possible to further reduce the smoothness of operation of the shift lever 12 from the PARKING position P to the reverse-select position "R-select" via the parking-select position "P-select".

It is also noted that the amount of play of the shift lever 12 in the shift direction at a position near the parking-select position "P-select" is very small or almost zero, so that the required width dimension of the lock lever 26 as measured in the shift direction can be reduced, with a result of a decrease of the required space for pivoting the lock lever 26 to its unlocking position, whereby the required size and weight of the lock lever 26 can be reduced. As indicated above, the sliding contact of the shift lever 12 with the inclined front guide surface 72 which is likely to take place during the movement of the shift lever 12 from the PARKING position P to the parking-select position "P-select" causes the shift lever 12 to receive the reaction force E, so that the component of the resultant force D acting in the select direction (transverse direction of the vehicle) is smaller than the operating force F, whereby the strength of the lock lever 26 required to withstand the force acting on the shift lever 12 in the select direction is accordingly reduced, making it possible to further reduce the required size and weight of the lock lever 26.

It is to be understood that the preferred embodiment of the present invention has been described above by reference to the accompanying drawings, for illustrative purpose only, and that the present invention may be embodied with various changes, modifications and improvement, which may occur to those skilled in the art.

What is claimed is:

1. A vehicular shift lever device wherein a path of movement of a shift lever is defined by a guide slot having a corner portion which has an angle of bend of about 90° and which corresponds to an intermediate position of the shift lever that is spaced apart from a parking position in a select direction and from other operating positions in a shift direction perpendicular to the select direction, so that the guide slot permits the shift lever to be operated from the parking position to one of the other operating positions, when the shift lever is first moved from the parking position to the intermediate position in the select direction and then moved from the intermediate position to said one other operating position in the shift direction, wherein:

said guide slot includes a first guide surface and a second guide surface which define a width of a first portion of said guide slot between first and second positions respectively corresponding to said parking position and said intermediate position, wherein said width extends in a first direction extending from one end to another end in the shift direction, and wherein said first guide surface is more distant in said first direction than said second guide surface from a third position corresponding to said one other operating position, and wherein said width of said first portion of said guide slot has a dimension in said first direction which decreases from a value at said first position to smaller values at positions along said first portion which are closer to said second position such that as said shift lever is moved from the parking position in a second direction transverse to said first direction, the width with respect to said first direction of the guide slot at a location of the shift lever becomes smaller.

2. The vehicular shift lever device according to claim 1, wherein said first guide surface is a straight surface inclined by a predetermined angle with respect to said second direction such that said width of said first portion of the guide slot in the first direction linearly decreases as said portion extends in said second direction from said first position toward said second position.

3. The vehicular shift lever device according to claim 1, wherein said second guide surface is a straight surface substantially parallel to said second direction.

4. The vehicular shift lever device according to claim 1, which is operatively connected to a transmission of a vehicle including an output shaft which is locked when said shift lever is placed in said parking position, and wherein said intermediate position is a parking-select position, while said one other operating position is a reverse-select position which is spaced from said parking-select position in said shift direction and spaced from a reverse-drive position in said select direction, said automatic transmission being placed in a position for reverse running of the vehicle when said shift lever is placed in said reverse-drive position.

5. The device according to claim 1, wherein the second direction is substantially perpendicular to said first direction.

6. The device according to claim 5, wherein said width decreases until reaching a second portion of said guide slot, and wherein in said second portion said guide slot extends substantially parallel to said first direction, and wherein in said second portion said slot has a dimension in said first direction which is substantially larger than its dimension in said second direction perpendicular to the first direction.

7. The device according to claim 5, wherein in said first portion of the guide slot the shift lever is movable by a play amount in said first direction, and wherein said play amount decreases as said shift lever is moved from said parking position toward the intermediate position.

8. The device according to claim 5, wherein said second guide surface is substantially parallel to said second direction.

9. The device according to claim 8, wherein said first guide surface is not parallel to either of said first and second directions.

10. The device according to claim 9, wherein said first guide surface is a straight surface extending at an angle with respect to said second guide surface.

11. The device according to claim 10, wherein said width of said first portion of said guide slot in said first direction is at a maximum at said parking position.

12. The device according to claim 1, wherein said width of said first portion of said guide slot in said first direction is at a maximum at said parking position.

13. The vehicular shift lever device according to claim 1, wherein said second guide surface is substantially parallel to said second direction and substantially perpendicular to said first direction, and wherein said first guide surface is not parallel to either said first direction or said second direction and wherein said shift lever is movable by a play amount in said first direction, and wherein said play amount is at a maximum at said parking position and decreases as said shift lever is moved from said parking position toward said intermediate position.

14. The vehicular shift lever device according to claim 1, further comprising a shift lock member movable between a locking position for inhibiting a movement of said shift lever from the parking position to the intermediate position, and an unlocking position for permitting said movement of the shift lever, said locking position being located on said path of movement of the shift lever between the parking and intermediate positions.

15. A vehicular shift lever device wherein a path of movement of a shift lever is defined by a guide slot having a corner portion which has an angle of bend of about 90° and which corresponds to an intermediate position of the shift lever that is spaced apart from a parking position in a select direction and from other operating positions in a shift direction perpendicular to the select direction, so that the guide slot permits the shift lever to be operated from the parking position to one of the other operating positions, when the shift lever is first moved from the parking position to the intermediate position in the select direction and then moved from the intermediate position to said one other operating position in the shift direction, wherein:

said guide slot having a first guide surface and a second guide surface which define a width in said shift direction of a portion of said guide slot between first and second positions respectively corresponding to said parking position and said intermediate position, said first guide surface being more distant in said shift direction than said second guide surface from a third position corresponding to said one other operating position, and being inclined with respect to the select direction, in the shift direction such that said width of said portion of said guide slot decreases from a value at said first position which is larger than a diameter of said shift lever, to a value at said second position, as said portion extends in said select direction from said first position to said second position;

the device further comprising a shift lock member movable between a locking position for inhibiting a movement of said shift lever from the parking position to the intermediate position, and an unlocking position for permitting said movement of the shift lever, said locking position being located on said path of movement of the shift lever between the parking and intermediate positions.

16. The vehicular shift lever device according to claim 15, further comprising a guide member having said guide slot formed therethrough, and wherein said guide member defines said locking position of said shift lock member.

17. The vehicular shift lever device according to claim 16, wherein said shift lock member includes an engaging jaw, and said guide member includes an engaging portion, said engaging jaw engaging said engaging portion, whereby said shift lock member is held in said locking position.

* * * * *